Jan. 4, 1966     T. L. BROWN     3,226,790
FASTENER
Filed June 7, 1962     5 Sheets-Sheet 1
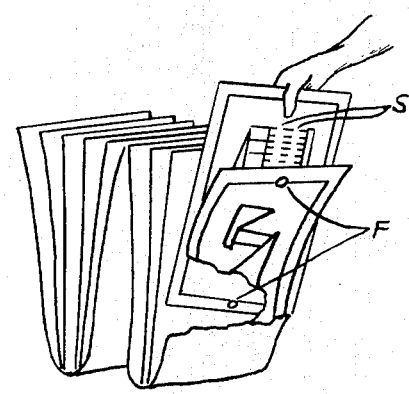
Fig. 1
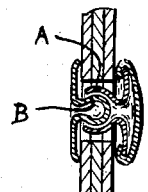
PRIOR ART
Fig. 3
Fig. 2
PRIOR ART
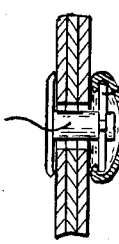
PRIOR ART
Fig. 4
PRIOR ART
Fig. 5
Fig. 7
PRIOR ART
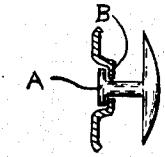
Fig. 8
PRIOR ART
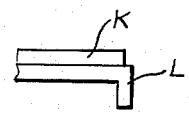
Fig. 9
Fig. 6
PRIOR ART
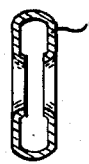
Fig. 10
Fig. 11
Fig. 12
Fig. 13
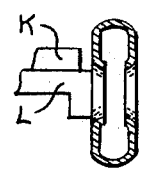
Fig. 14
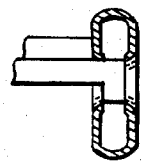
Fig. 15
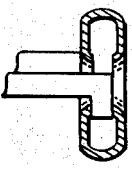
Fig. 16
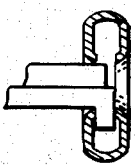
Fig. 17
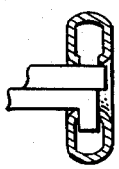
Fig. 18
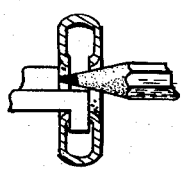
Fig. 19

Jan. 4, 1966  T. L. BROWN  3,226,790
FASTENER
Filed June 7, 1962  5 Sheets-Sheet 2
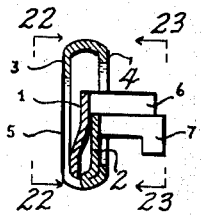  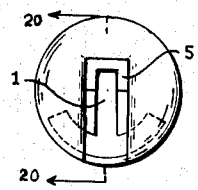 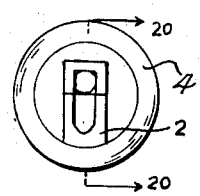
Fig. 20   Fig. 21   Fig. 22   Fig. 23
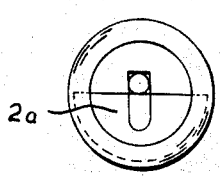 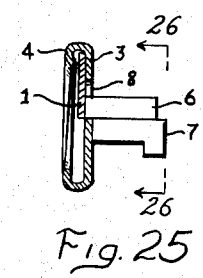 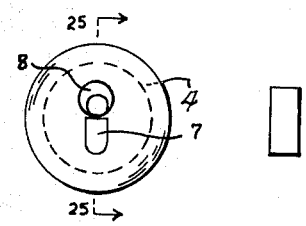 
Fig. 24   Fig. 25   Fig. 26   Fig. 27
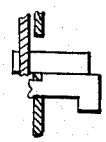 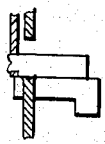  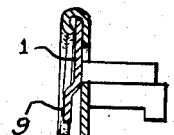 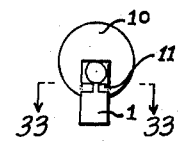
Fig. 28   Fig. 29   Fig. 30   Fig. 31   Fig. 32
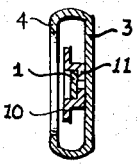 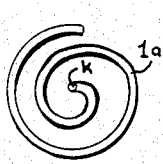 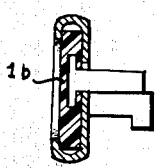 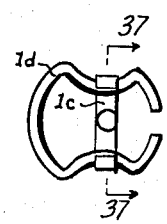
Fig. 33   Fig. 34   Fig. 35   Fig. 36
 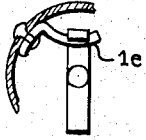 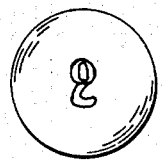 
Fig. 37   Fig. 38   Fig. 39   Fig. 40

Jan. 4, 1966 T. L. BROWN 3,226,790
FASTENER
Filed June 7, 1962 5 Sheets-Sheet 3

Jan. 4, 1966  T. L. BROWN  3,226,790
FASTENER
Filed June 7, 1962  5 Sheets-Sheet 4
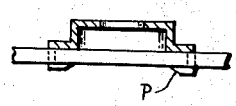 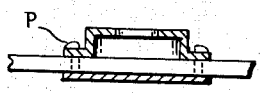 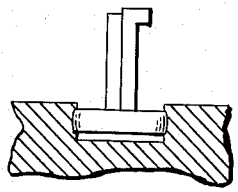
Fig. 55  Fig. 56  Fig. 57
   
Fig. 58  Fig. 59  Fig. 60  Fig. 61
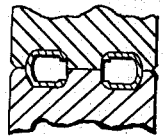 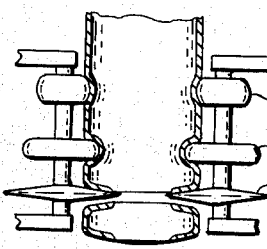 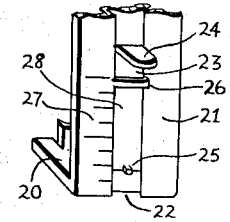
Fig. 62  Fig. 63  Fig. 64
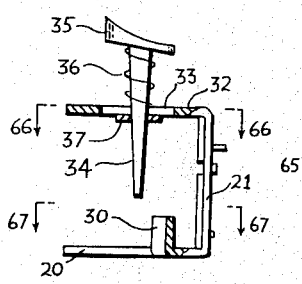 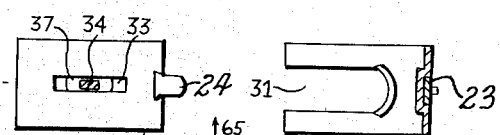 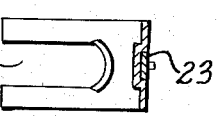
Fig. 65  Fig. 66  Fig. 67

United States Patent Office 3,226,790
Patented Jan. 4, 1966

3,226,790
FASTENER
Theodore L. Brown, Appleton, Maine
(Star Rte., Union, Maine)
Filed June 7, 1962, Ser. No. 200,800
11 Claims. (Cl. 24—211)

This invention relates to smooth non-scratching fasteners that are separable but cannot be separated by unscrewing the elements or pulling them apart axially or transversely, and that present no sharp corners or edges that can scratch adjacent sheets of paper.

More often than is necessary, fasteners such as the two-prong type used to hold drawings together, for example drawings for patent applications, scratch the ink off drawings filed behind them in the cabinet drawers when the drawings are removed or refiled, necessitating reinking of the scratched portions.

An object of this invention is to provide fasteners overcoming the above problem.

Another object is to provide fasteners useful for holding sheets of material together and requiring very little space beyond the thickness of the sheets.

A further object is to provide fasteners separable by a person but not permitting accidental unscrewing, or pulling apart axially or transversely of the fastener.

These and further objects will be apparent from the accompanying specification and drawings, in which:

FIGURE 1 is a perspective view of a drawing file.

FIGURES 2 and 3 are enlarged views of a fastener that has been used for such drawing files in the past.

FIGURES 4 to 8 show vertical sectional views and a plan view of four other devices that could be used to hold sheets of drawings together.

FIGURE 9 is a side view of the interlocking mechanism utilized with the fasteners of this invention.

FIGURES 10 to 13 show four forms of fastener cap, in side section such as along line 41—41 of the cap of FIGURE 42.

FIGURES 14 to 17 show the steps of placing the cap on the interlocking mechanism. FIGURE 18 is similar to FIGURE 17, but shows a longer straight element of the mechanism. FIGURE 19 shows the first step in removing the cap.

FIGURE 20 is a sectional view of one form of base or clamping member structure, taken on lines 20—20 of FIGURES 22 and 23. FIGURE 21 is a plan view of a biasing means used in the base. FIGURES 22 and 23 are bottom and top plan views taken on lines 22—22 and 23—23 respectively of FIGURE 20. FIGURE 24 is a top plan view, similar to FIGURE 23, of a slightly modified form of base.

FIGURE 25 is a sectional view on line 25—25 of FIGURE 26, showing an alternate form of base structure for the interlocking mechanism. FIGURE 26 is a top plan view of the base on line 26—26 of FIGURE 25. FIGURE 27 shows one form of biasing means used in the base.

FIGURES 28 and 29 show various ways to connect the interlocking mechanism with the base structure.

FIGURE 30 is a vertical sectional view of an alternate form of cap, usable with the device of FIGURE 25.

FIGURE 31 is a vertical sectional view of an alternate form of the device of FIGURE 25, having a puller integral with the spring.

FIGURE 32 is a top plan view of a separate spring puller disk usable with the device of FIGURE 25. FIGURE 33 is a vertical sectional view, taken along line 33—33 of FIGURE 32.

FIGURES 34 to 38 show modified forms of biasing means, FIGURE 37 being a sectional view along line 37—37 of FIGURE 36.

FIGURE 39 is a top plan view similar to FIGURE 26, showing one element of the interlocking mechanism formed from rod material bent around in a radius and connected arc. FIGURE 40 is a side view similar to FIGURE 9 showing the element bent upon itself to form its head.

Figure 41:
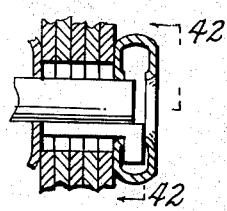
Figure 42:
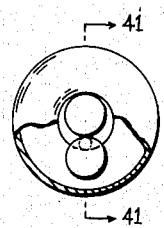
Figure 43:
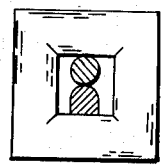

FIGURE 41 is a vertical sectional view along line 41—41 of FIGURE 42, with the shaft of the headed interlocking member abutting the cap firmly. FIGURE 42 is a top plan view partially in section, along line 42—42 of FIGURE 41. FIGURE 43 is a similar view, showing a non-toroidal cap and in section a flattened latch portion abutting a straight edge of the aperture.

Figure 44:
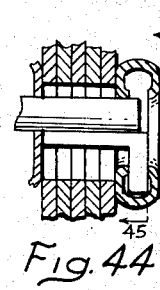
Figure 45:
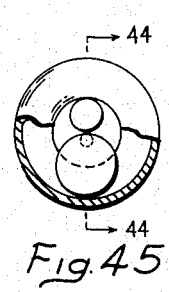

FIGURE 44 is a vertical sectional view along line 44—44 of FIGURE 45, with the end of the head of the headed member abutting the cap inner surface firmly. FIGURE 45 is a top plan view, partly in section, along line 45—45 of FIGURE 44.

Figure 46:
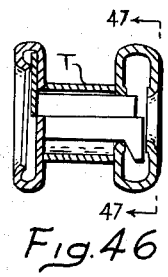
Figure 47:
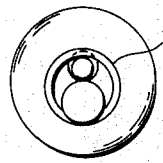
Figure 48:
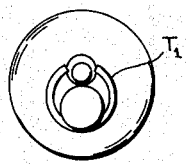
Figure 49:
Figure 50:

FIGURE 46 is a vertical sectional view similar to FIGURES 41 and 44, showing the addition of a tubular guide element. FIGURE 47 is a top plan view of the guide and base along line 47—47 of FIGURE 46 without the cap. FIGURE 48 shows an alternate form of guide, not a complete annulus. FIGURE 49 is a perspective view of one way to make the guide of FIGURES 46–48. FIGURE 50 shows an alternate form of the latch of FIGURE 46.

Figure 51:

FIGURE 51 shows in vertical sectional view an alternate form of the cap of FIGURE 10, providing adjustment for different thicknesses of paper.

Figure 52:
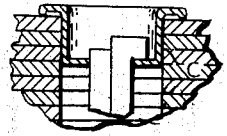
Figure 53:
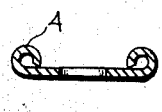

FIGURE 52 shows in vertical sectional view a one-aperture cap usable with great thicknesses of paper, and of a design to be formed in different lengths. FIGURE 53 shows in vertical sectional view a different form of one-aperture cap.

Figure 54:
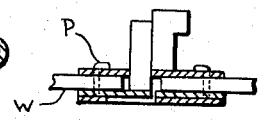

FIGURE 54 shows in vertical sectional view an alternate form of base, and FIGURES 55 and 56 show in vertical sectional views alternate forms of the cap of FIGURE 52, which may be fixed to a piece of sheet material.

FIGURE 57 shows any of the bases perviously disclosed, seat in a bore.

FIGURES 58 and 61 show views of vertical sectional alternate forms of caps, made from two elements.

FIGURE 62 shows in vertical sectional view an example of dies that may be used to form the cap of FIGURE 10, with the sectioned cap shown in FIGURE 10 inserted therein. FIGURE 63 shows wheels that may be used to form the caps.

FIGURE 64 is a perspective view of a gauge usable to determine the size of the interlocking mechanism and cap to be used. FIGURE 65 is a side view, partly in section, along line 65—65 of FIGURE 66, showing a cap removing device attached to the gauge of FIGURE 64. FIGURE 66 is a top plan view along line 66—66 of FIGURE 65; and FIGURE 67 is a sectional view along line 67—67 of FIGURE 65.

Figure 68:
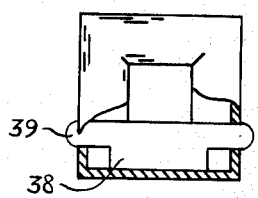
Figure 69:
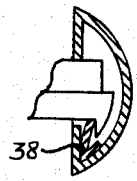

FIGURE 68 shows a top plan view partly in section of a cap like that of FIGURE 43 having an inner spring with which the latch engages, to place the latch under tension. FIGURE 69 is a vertical sectional view of cap as in FIGURE 30 having such an inner spring.

Figure 70:
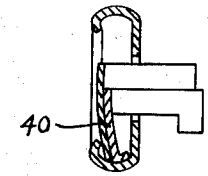

FIGURE 70 shows in vertical sectional view a base as in FIGURE 20 or 25 having an inner spring to place the latch under tension.

Figure 71:
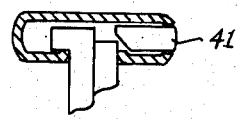
Figure 72:
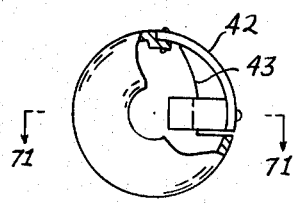

FIGURE 71 is a vertical sectional view along line 71—71 in FIGURE 72 of a cap as in FIGURE 30 having a transversely-actuated wedge release for the lock, with FIGURE 72 being a sectional lower view thereof showing the wedge biased normally outward by a spring.

Figure 73:
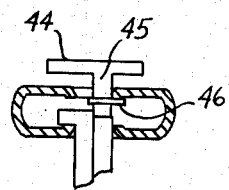
Figure 74:
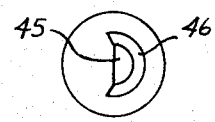

FIGURE 73 is a vertical sectional view of a cap like that of FIGURE 10 having a longitudinally-actuated button release for the lock, and FIGURE 74 is a lower view of the button.

Patent applications usually have more than one sheet of drawings, which sheets must be held together to avoid mixing with those of other applications. The holding could be done by an ordinary staple, but such would prevent separability, which is desirable since the drawings are often separated to be laid out on an examiner's desk or draftsman's table for example. To provide this separability, each sheet of drawings is punched with a hole, the holes being aligned, and an ordinary two-prong fastener is passed through the holes and its prongs are bent to each side to hold the fastener in position. Such holes are usually punched at the top, but are preferably punched at the bottom of the drawings so that the sheets may easily be flipped while searching. The drawings are stored vertically in the file cabinets, as shown in FIGURE 1. When the prongs of the fastener are forward, FIGURE 2, no problem arises since the ink is only on the forward side of the drawing sheet. However, upon reassembly of the drawings by the examiner, draftsman, or others, the fasteners F are often incorrectly placed with the prongs to the rear, FIGURE 3. With such fastener in holes at the top, the drawing filed behind it is subject to scratching upon removal or refiling, as shown at the two scratch lines S in FIGURE 1; similarly, with such fastener in holes at the bottom, when the drawing is removed or refiled it is possible to scratch the drawing filed behind it.

Types of fasteners presently on the market could overcome this scratching problem, but all have various undesirable characteristics. For example, a common axially movable snap fastener such as shown in FIGURE 4 could be utilized, with either the base stud B or the cap socket A resilient to engage the non-resilient other member; but such snaps would come apart under the high leverage prying force of the drawing sheets when the drawings are being searched. Similarly, a separable fastener such as the transversely movable device of FIGURES 5 and 6 could be utilized, having a base with a cylindrical stud B peripherally grooved near its free end, and a cap containing a transverse resilient gripper means A such as a flat plate or the round wire shown in FIGURE 6 defining a large opening which may be passed over the head of the base stud, a small opening, and a slot connecting the openings so that the cap may be snapped transversely to seat the gripper means in the stud groove, with the small opening holding the stud and cap against axial disengagement; but nothing except the gripper slot resiliency prevents transverse disengagement. Fasteners such as the one of FIGURE 7 commonly found in small keycases and having a threaded stud B and threaded socket A or the fastener of FIGURE 8 having a bayonet stud B and slotted base A and disclosed in U.S. Patent No. 2,401,057 also could be used, but such would tend to unscrew and disengage since the drawing sheets are commonly rotated relative to each other during a search.

The interlocking mechanism of the present invention, which does not have undesirable characteristics of unscrewing or prying apart, is shown in FIGURE 9, comprising an L-shaped latch or gripper member L and a straight lock member K slidable with respect to L. Such connector mechanism per se is old, being shown in U.S. Patent No. 2,136,875 of J. J. Blanc and in many others such as the several patents to H. J. Modrey, No. 2,464,543 being an example. However, none of such devices seems capable of being utilized to hold drawing sheets together. One reason is that they usually comprise only a base member having an L latch and a slidable lock, but do not provide a cap for the latch to engage; without a cap, the drawing sheets could easily slip past the L head, being more flexible than the stiff layers held together by such capless prior devices. Another reason such prior devices are impractical is that, even with a cap as in some of the Modrey devices (none of which are used to hold sheets together), their lock-operating mechanism and other structure does not permit a reduction in size to be practicable. The basic reason for this is that the lock operating mechanism is usually a spring of some sort releasable only from the rear, at the end of the lock not adjacent the head of the L-shaped member; one of the several hearts of the present invention resides in the fact that the lock is releasable from the front, at the end near the L head and cap, although also disclosed are ways to release the lock from the rear and still permit a substantial reduction in size necessary for the limited space available in a file drawer.

The solution is so simple as to be almost obvious. FIGURES 10 to 13 show examples of the cap, with a hole through which a probe, such as a pencil point, may be passed to press the lock from the front and slide it out of engagement.

The cap O is in the form of a toroid of C-shaped cross section, of a continuously curving C slightly flattened as in FIGURE 10, to assure a smooth non-scratching exterior, although a non-flattened C as in FIGURE 11, or a square-cornered C in FIGURE 12 or U in FIGURE 13, could be chosen. The two circular apertures defined by the toroid are preferably of equal diameter so that the cap is reversible.

The cap is engaged with the latch mechanism as follows: align one cap aperture with the L-head, with the cap surface in position to abut the end of the lock, FIGURE 14. Press the cap axially to permit the L head to enter the cap while simultaneously sliding the lock out of the way, FIGURE 15. Press the cap transversely, FIGURE 16, to permit the L-head to enter the side cavity of the cap, and when the cap is pressed as far as possible the lock will slide into the cap to lock it in position, FIGURE 17 or 18. The inwardly curved surface of the toroid of FIGURES 10 or 11 will guide the lock into the aperture. The lock may be of a length to engage only one aperture surface, FIGURE 17, or both, FIGURE 18, but the former length is preferable since it requires a shorter motion of the lock to move it out of locking engagement, which shorter motion permits the base to be thinner and of smaller diameter.

To remove the cap, reverse the procedure: press the lock with a pointed object such as a pencil until it is out of the cap, FIGURE 19; press the cap transversely (and remove the pointed object) so that the lock is held retracted by the cap, FIGURE 16; continue moving the cap transversely until the L head is completely withdrawn from the cap side cavity, FIGURE 15; and then pull the cap axially off the L head, FIGURE 14. The pencil of FIGURE 19 is not intended to indicate the size of the cap by comparison, since any size cap and base may be utilized as desired.

Since the lock is releasable from the front and needs only a short stroke to be released, FIGURE 17 as described above, the base member on which it is mounted may be relatively thin and of small diameter since no large finger-grip area or highly compressible coil spring is necessary as in the prior devices. The only criteria to be observed in the design of the lock biasing means are (1) that it is biased toward the cap, and (2) that there is an abutment to prevent the means from pressing the lock through the cap into scratching position, if the cap should happen to be mounted toward the rear rather than the front. Other than that, almost any type of biasing means occupying a thin space may be utilized. For example, in FIGURE 20 the biasing means is shown as a simple flat metal leaf spring 1 biased to abut against the portion 2 of the base casing 3 which encloses the spring. This spring may be a rectangle with further supporting structure gripped by casing 3, such as the spring of FIGURE 21 similar to that shown in Patent No. 1,958,024. Lock 6 is mounted on the free end of spring 1. The casing may take the form of a flat circular piece of metal having a turned-over flange 4 and a portion 2 pressed up from aperture 5. The portion 2 serves as a mounting for latch 7 as well as an abutment for spring 1, and aperture 5 is wider than the flexible portion of spring 1 as shown in FIGURE 22 so that the spring may pass therethrough if necessary when the lock is pushed into retracted position, FIGURES 14 to 16. The edges of aperture 5 are turned inward slightly to avoid scratching. While portion 2 is conveniently formed from the portion removed to form aperture 5, portion 2 could be eliminated and replaced with a separate mounting and abutment member 2a, in the form of a semicircular plate for example as shown in FIGURE 24; and aperture 5 could be omitted, if the casing is thick enough to permit the lock to be retracted. The casing 3 may also be somewhat the reverse of the former, as shown in FIGURES 25 and 26, in the form of a flat circular piece of metal having a turned-under flange, indicated at 4 in FIGURE 25 and the dashed circle in FIGURE 26, to grip the spring and to provide a non-scratching edge, having an aperture 8 through which the lock 6 extends, and having an L-shaped latch member 7 secured thereto. The spring may be a flat rectangle, FIGURE 27, or may be such as in FIGURE 21. The attachment between the lock and spring and between the latch and casing may be of any form, such as welding, or one member passing through an aperture in the other with the one member expanded in or beyond the aperture or the other member compressed on the one member, as variously shown in FIGURES 28 and 29; or the lock and spring, and the latch and casing, may be integrally formed from the same piece of material.

It is to be noted that the casing of FIGURE 25 permits the lock to be retracted by pulling on the spring from the rear if desired, either with the fingers or with a hook or lever tool such as a paperclip or straight pin. In such an instance the cap could be open on only one side, FIGURE 30. Note that this cap is relatively flat on the left while rather curved on the right; this modification is peculiarly adapted to have its juncture of the flat and curved surfaces rather sharp as in FIGURE 69 and even extending in a peripheral ridge beyond the plane containing the flat surface, so as to firmly seat against the fastened sheets to prevent other sheets from slipping between the cap and the fastened sheets, similar to some types of thumbtacks for draftsmen. Such sharp edge or peripheral ridge may obviously be applied to most of the other caps and bases disclosed.

The spring may have a pulling portion 9, FIGURE 31, or a separate spring pulling element may be permanently engaged with the spring, such as in the form of a disk 10 with one prong or a pair of prongs 11 bent up and over the resilient portion of spring 1, as shown in FIGURES 32 and 33, the disk being of a size to fit within the edge of flange 4 with space enough to grip the disk, as with a fingernail. The casing of FIGURE 25 could also have its open back closed, when used with the double aperture cap of FIGURE 10 for example, as long as the casing is thick enough to permit the lock to be retracted from the cap.

Another form of spring usable with the base casing of FIGURE 25 is shown in FIGURE 34. In this modification the spring 1a is in the form of a spiral of wire spring material such as found in the base of many flashlights, and the lock K may comprise a bent-up portion of the spring material. The wire may spiral all the way to the lock as shown, or only around in flange 4 and then straight in to the lock. Still another form is shown in sFIGURE 35, comprising a resilient disk 1b such as rubber with the head of a rivet-like lock molded therein. Another form is shown in FIGURES 36 and 37, usable with a base casing similar to that of FIGURES 23 or 24 for example, except that aperture 5 should extend across the full width of the casing if the casing is thin, or should be eliminated as unnecessary if the casing is thick, comprising a leaf spring 1c provided with additional biasing force by spring 1d, whose legs are biased toward each other and thus act to flex spring 1c inwardly and upwardly toward the cap. Only one half of spring 1d could be present if desired, or a spring such as 1e in FIGURE 38 attached at one end to the casing could be utilized. Each of the biasing means of FIGURES 34 to 38 could also be provided with a puller portion, either integral or separate, as in FIGURES 31 to 33. It is obvious that many other forms of springs occupying a thin space could be used.

The L-shaped headed latch may be formed in many different ways, such as from rod material, of any cross section but preferably circular, with a head swaged from the material as is common in nail-like objects, from rod or wire material bent around or upon itself as respectively shown in FIGURES 39 and 40 for example similar to the views of FIGURES 26 and 9 respectively, or by casting. Similarly, the lock may be formed from rod material of any cross section such as circular or rectangular, and may even be crescent-shaped in cross section to embrace the shaft of the latch if the latter is circular in cross section, as in Blanc Patent No. 2,136,875 referred to previously. The only criteria to be observed are, that the dimensions of the lock, latch, and cap be properly related to assure the lock and latch fitting in the cap firmly, to prevent accidental disengagement of the cap and base. For example, if the shaft of the latch is to abut the edge of the cap aperture, FIGURES 41 and 42, the length of the latch head is immaterial, as long as it can fit in the cap; the cap aperture should be large enough to clear the latch head, and the aperture and lock width should be designed to assure a tight fit—the aperture should be of a diameter equal to the combined widths of the lock and latch shaft. Note that the cap may be of non-toroidal configuration, as exemplified by the square cap in FIGURE 43, and the latch may have a flat portion to abut the straight edge of the aperture or an angled portion if it is desired to orient the latch and lock diagonally of the square aperture shown, to prevent any cap rotation that might enable the cap to become disengaged; but the toroidal type of cap is preferred, since it provides a smooth circular contact surface with no corners, and its rotation is unimportant.

If the end of the head of the latch is to abut the inner surface of the cap cavity, FIGURES 44 and 45, the width of the latch shaft is immaterial as long as it can fit in the aperture; the cap aperture again should be large enough to clear the latch head, the cap and latch head should be designed so that the short under surface of the head is at least as long as the distance from the aperture edge to the distant cap cavity surface, and the lock should be of a width to fit tightly in the aperture. Furthermore, the axial distance between the edges of the two apertures should be substantially the same as the thickness of the latch head, FIGURES 41 and 44, to prevent wobbling of the cap on the head, and the thickness of the cavity also should be substantially the same as the thickness of the latch head, especially at the end of the head, to prevent the cap from pivoting out of engagement with the lock and then off the latch. This would be present inherently in the device of FIGURE 44 where the side surface of the cap is curved close to the end of the head, but would not necessarily be true if the cap were of the form of FIGURE 12 for example; and while the end of the L head of FIGURE 41 does not actually contact the cap inner surface, it is close enough to prevent the cap from pivoting off the lock and may be made even closer by providing more of a V-shaped taper at the cap edge, as in the shape of a discus.

To assure a tight fit in the papers, the paper holes preferably are of a diameter only slightly greater than the combined widths of the lock and latch shaft, as shown in FIGURE 41. However, this would necessitate slipping each paper over the latch head and then onto the lock and latch shaft one at a time. For quicker and easier assembly, the paper holes may be of a diameter slightly larger than the combined width of the lock and length of the latch head, FIGURE 44, so that the lock and latch may be passed through a great many sheets at once. These large holes unfortunately will permit the papers to move transversely with respect to each other on the latch, but such movement would be limited and the cap would still be too large to pass through the holes.

Furthermore, such movement may be eliminated by the provision of a guide secured to the base, such as a tube T of the same diameter as the holes as shown in FIGURES 46 and 47 surrounding the lock and latch and having its outer surface aligned with the end of the latch head, or a partial tube $T_1$ not surrounding the lock as shown in FIGURE 48 so that the paper hole may be of a diameter only slightly larger than the combined width of the lock and length of the latch head. Either tube T or $T_1$ may be formed from the same piece as the latch, as shown in FIGURE 49; and the tube should be slightly shorter than the latch shaft, of a length to abut or substantially abut the cap when the latter is in place so that no paper may slip between the tube and cap. To assure the cap fitting against the tube, the under side of the latch head may be cut at a slight angle as shown exaggerated in FIGURE 46, so that the latch head will wedge the cap against the tube when the cap is attached; this angle may be provided by a slight angular bend, if the latch is made from bent rod or wire as shown exaggerated in FIGURE 50. If the angular latch is utilized with the tubeless bases, it will tend to wedge the cap against the fastened sheets thus assuring a proper gripping. The lock may be tapered to assure a proper fit; this is shown in FIGURE 50 and is applicable to any of the locks disclosed.

The latch and lock may be of any length desired, depending upon the thickness of the material to be accommodated. An assortment of different sizes may be kept on hand, all usable with the same cap such as that of FIGURE 10. Different thickness flat spacer washers may be used on the lock and latch, adjacent the base or cap, to adjust the fit. For even greater variation of thicknesses able to be accommodated, the cap could be in the form shown in FIGURE 51, with one of the aperture-defining surfaces curved farther in than the other. If the aperture defined by the lesser-curved surface is the one through which the latch passes, and the paper is not gripped tightly enough, the cap may be turned over and the latch passed through the other aperture instead. The cap of FIGURE 60 would have this two-size effect also.

Greater variation is permitted by the cap shown in FIGURE 52, the surface C being of a diameter to fit in the paper holes, and an assortment of these caps of different lengths, used with the various length latches, would provide accommodation of virtually any thickness of papers. The cap of FIGURE 52 usually is convenient only for great thicknesses of paper; thus the cap of FIGURES 10 or 51 is ordinarily preferred. Note that the cap of FIGURE 52 has only one aperture, and its body fits in the paper holes with the flange outside. Such a one-aperture cap open from the front may be made without a body portion, as shown in FIGURE 53, similar to base 3 of FIGURE 25 made from a washer-like object with a turned-over flange 4 to provide a smooth non-scratching surface. The cap of FIGURE 53 may have its aperture close to or spaced farther from the rear surface which faces the base, similar to the aperture distance variation disclosed for the cap of FIGURE 51. The flange 4 may be turned up and then inwardly and down, as shown in FIGURE 53, or it could be turned up and then outwardly and down, and then inwardly if desired; either form would be non-scratching.

If it is desired to fix the base to a sheet of material, such as to a file wrapper if the present fastener were used to hold the application papers in the file wrapper, it could be formed of two pieces. One piece may have prongs P to pass through the file wrapper W, then through complementary apertures in the other piece and bent over to hold the base in place as shown in FIGURE 54. An aperture may be provided in the file wrapper for the lock to pass through if it is assembled with the lower piece as shown, or for the lock and spring to be retracted through if they are assembled with the upper piece to which the latch is secured. To provide for changing thickness of paper, a cap as in FIGURE 51 or 52 may be utilized with the device of FIGURE 54; the FIGURE 52 cap is preferable, caps of greater length being utilized as more papers are added. Similarly, a cap as in FIGURE 52 may be inverted and held to a wrapper by prongs through the wrapper, extending either from the cap down through the wrapper and bent tight as is done with a staple, FIGURE 55, or from an additional plate up through the wrapper and cap and bent over against the cap as in FIGURE 56. With these forms, a rear-releasable base as in FIGURE 25 should be utilized, of varying lengths as more papers are added. The additional plate in FIGURE 56 prevents the lock and latch from being pressed through the wrapper.

If the fastener were to be used in a note or calendar stand, for example, either the base or the cap could be press-fitted into a bore in the stand or molded in the stand if the latter were plastic, exemplified by the base and stand shown in FIGURE 57. Several bases or caps may be spaced in various arrangements along a planar or curved surface, such as in a rectangular array at the corners or edges of a box to be used to fasten a cover to the box. A very important use of the fasteners is in binders such as ledgers, photograph albums, scrap books and the like utilizing screw binding posts like that of FIGURE 7. For example two bases could be arranged along the binder edge; the bases may be either separate, or as a unitary double extension base with the latch-lock units spaced apart as outer legs on the bight portion similar to prior double prong clips or other double extension fasteners. In either case there can be an individual cap for each latch-lock unit, or both caps may be joined into one elongated cap either with two separate spaced openings or with one long opening to pass onto the two spaced latch-lock units. With such multiple arrays, a multiple release member may be provided having a release point for each lock; for the double unit, such release member could be simply a U-shaped member with pointed legs, similar to hand punches used to open canned evaporated milk.

For the extension problem mentioned above concerning binder posts and the like, each post may comprise two rear-releasable bases with their latches seated in a central double-aperture cap, each aperture receiving the latch-lock of its respective base, the cap being dimensioned to remain in the sheet holes with one base each at the top and bottom of the layer of sheets. Similarly, two bases may be joined back to back to act as the central member, each base having its latch-lock seated in a double-aperture cap as in FIGURE 10 or the like at the respective top or bottom of the sheet stack. For greater thicknesses of sheet layers, any one or more of the elements (base, central cap, base; or cap, back-to-back central base, cap) may be replaced by elements accommodating greater thicknesses, such as longer elements, as discussed previously.

Either the cap or the base may be made of metal or plastic, and of two or more pieces rather than one. For example, FIGURES 58 to 61 show caps similar to those of FIGURES 10, 10, 13, and 30 respectively, made from two pieces as is common in the grommet and fastener art, wherein FIGURE 58 shows a cap with a cemented or soldered or fused joint, a bead joint is shown in FIGURE 59, and the caps of FIGURES 60 and 61 have overlapped portions.

The one-piece cap of FIGURES 10 and 51 for example may be formed in any manner such as by compressing a short length of tubing inwardly with two matching dies having annular recesses, FIGURE 62, similar to the dies in Patent No. 987,716 used to compress tubing outwardly in a rivet form. However, this method may cause the portion near the aperture to have slight pleats, depending upon the thickness and ductility of the material employed. Thus a method as used in the formation of bellows or flexible tubing, as in FIGURES 6 and 7 of Patent No. 2,358,291, or as depicted in the present FIGURE 63 may be utilized. The latter figure shows a first crimping wheel 12 with a rounded edge and of small diameter to crimp the tubular stock material, a second crimping wheel 13 of larger diameter and with a narrower rounded edge to crimp the tubular material even more, and a final wheel 14 of largest diameter to force the material inwardly as far as it should go and having a sharp edge to cut off each single-toroid portion. A common axle passes through each wheel, and through optional intermediate spacing tubes, and is attached at its ends for rotation in a support structure. One or two sets of such wheels with any necessary material guide rollers, or three or more sets with no other guide rollers required, may be spaced circumferentially about the material. Either the wheel supporting structure or the tubular material may be rotated, while each wheel support is forced inwardly, to cause the crimping and cutting. After the inward fixed limit is reached, the wheels are withdrawn outwardly, the tube advanced one notch relative to the wheels so that the first crimp is about to be crimped more by the second wheel and so forth, and the process is repeated over and over. The wheels 12 and 13 are spaced apart the same distance the tube is advanced so that wheel 13 will contact the center of the groove previously formed by wheel 12. The wheel 14 is spaced the same or a different distance as desired, to properly contact the groove previously formed by wheel 13, on advancement of the tubing when making the cap of FIGURE 10; when making the cap of FIGURE 51, wheel 14 may be spaced closer to or farther from wheel 13, to cut off away from the center of the groove formed by 13. The cut-off portions may be passed through dies as in FIGURE 62 to assure that the aperture surfaces bend inwardly. Other appropriate configurations of dies or wheels to make the various caps, bases and other fastener components will be apparent.

To determine the length of the latch, and cap of FIGURE 52 if that is used, the thickness of the papers may be measured with any well known gauge including a common ruler. The length may also be approximated by holding the papers next to various locks and caps, if that would be acceptable. Preferably a gauge as shown in FIGURE 64 is used, comprising a base 20, a vertical stand 21 having a dovetailed groove 22 pressed therein, a blade 23 slidable in the groove and having a bent portion 24 to grasp when sliding the blade, a stud 25 on the blade to coact with stop portion 26 to limit the sliding of the blade, a scale 27 on the stand with its zero at the level of the bottom surface of the base, and a scale may optionally be placed at 28 on the blade to act as an extension of scale 27 when the blade is in its fully extended position. The use of such gauge is apparent: set it on a surface such as a desk, place the paper edges against it, extend the blade if necessary, and read the thickness from scale 27 or optional scale at 28. The stud 25 may be used as an index, indicating a reading on scale 27 to be added to the basic inch when the slide is used for material more than an inch thick; or optionally a scale provided at 28 may be calibrated from one to two inches to be read using the one inch mark on scale 27, or the top of stop 26, as an index.

The gauge forms part of a larger cap removing device, FIGURES 65 to 67, which may be supplied to release any of the two-aperture caps disclosed, or the one-aperture caps except for those in FIGURES 30 and 61. This device comprises not only base 20 and stand 21, but also a plate 30 pressed up from slot 31 in the base, a bracket arm 32 having a slot 33, a probe 34 passing through slot 33 and having a finger-engageable cup portion 35, a coil spring 36 to bias the probe away from base 20, and a shoulder 37 such as a washer secured to the probe to prevent it from passing completely through slot 33 under the action of the spring. Slot 33 permits the probe to pivot therein; probe 34 may be flat-sided as shown in FIGURE 66, if rotation is to be prevented in case cup portion 35 is at an angle to the probe as shown rather than perpendicular to the probe; if it were the latter, rotation would be immaterial. The pusher device may be used to perform the cap-releasing steps previously described in connection with FIGURES 19, 16, 15, and 14 as follows: the base 20 is slipped around the cap and under it if possible, with groove 31 surrounding the latch and plate 30 contacting the side of the cap. Cup 35 is then pressed with a finger to cause probe 34 to contact the lock and press it out of the cap. Stand 21 is moved transversely so that plate 30 will push the cap off the L head of the latch, while probe 34 is meanwhile allowed to withdraw from the cap under the action of spring 36, and the cap will be pushed off the latch under the action of the biased lock. The pusher device could assist this outward movement of the cap, if the stand 21 or bracket arm 32 were pulled outwardly with base 20 under the cap to lift it. The gauge and pusher device enable the desired unitary result of fastening and unfastening to be obtained, but are accessories provided if the use of a ruler and pencil, for the gauging and releasing steps, is not desired. The pusher can be in the form of a pliers device, similar to paper or leather hand punches.

Instead of using a cap as in FIGURES 51 and 60 having a two-size effect, a cap as in FIGURES 68 and 69 or a base as in FIGURE 70 may be utilized to grip the sheets tightly. FIGURE 68 shows a non-toroidal cap as in FIGURE 43, and FIGURE 69 shows a closed cap as in FIGURE 30, having a spring biasing means 38 engaging the L-latch to place it in tension, thus placing in compression the sheets through which the L-latch and lock pass. If the cap is open at the top as in FIGURE 68 the spring may be pressed down by the usual pencil point or the like while engaging the latch over it, then releasing the point to let the spring bias the latch. Optionally for FIGURE 68, but required for the closed cap of FIGURE 69, one or more spring tabs 39 may be provided by which the spring may be pressed down without using a pointed object. If it is desired to have such spring means in the base rather than in the cap, the structure of FIGURE 70, similar to that of FIGURE 20, may be utilized. Here the L-latch is connected to a spring 40, rather than directly to the base, to bias the head of the L-latch toward the base. The lock spring, acting in the opposite direction to bias the lock away from the base, is placed behind the spring 40 so that the lock end is always properly oriented with respect to the L-latch head for any thickness of sheets. Spring 40 may also be provided with presser tabs similar to 39.

To obviate the necessity of using a pin through the cap or a release member in the base to disengage the lock and latch, the cap such as that of FIGURE 30 may be provided with a lock-release element such as the transversely-actuated wedge 41 shown in FIGURES 71 and 72. The wedge is biased normally outward away from the lock by a spring biasing means 42, appropriately attached as by rivets to the cap and wedge member. To remove the cap, the spring and wedge are forced inwardly to force the wedge against the end of the lock, pushing it out of the cap. When the lock end is flush with the cap lower surface, the cap may be lifted slightly and pushed off the lock and latch. The cap may have one or both surfaces recessed as at 43 in the vicinity of the spring and wedge if desired to provide room for a finger or thumb to press the spring.

For caps used in a note or calendar stand, for example, the lock release may be actuated in the direction of the lock extent as shown in FIGURES 73 and 74. Here the release member may comprise a button 44 having a downwardly-extending stud 45 to engage the lock, and a means to retain the button in the cap such as ridge 46 on the stud extending at least a full semicircle around stud 45, for a cap having a circular aperture, to engage the lip of the cap aperture. If many sets of sheets are to be filed vertically or piled horizontally in contact with the caps holding each set, the releasable cap of FIGURES 71 and 72 would be preferably utilized rather than the longitudinally-actuated releasable cap of FIGURES 73 and 74, since even staggering the punched holes to avoid alignment of the different fasteners from set to set would not prevent accidental release of the fastener of FIGURE 73.

Even threaded or bayonet type devices such as shown in FIGURES 7 and 8 could be used to hold drawing sheets together, if provided with some sort of locking key and lock-biasing means such as disclosed above to prevent their unscrewing. For example, L latch 7 in FIGURE 25 could be replaced with a threaded screw and used in place of the right-hand screw member B of FIGURE 7, with the left-hand threaded socket A provided with one or more holes for the lock to enter. The lock would be held in retracted position until the screw had entered the socket as far as the paper thickness would permit, at which time the lock would be released and the screw member rotated backwards until the lock entered the hole provided, as possibly may exist in some forms of lock nuts. Similarly, the L latch of FIGURE 23 for example could be replaced with a bayonet stud, with the bayonet prong parallel to the end of element 2 (or parallel to the straight edge of 2a in FIGURE 24) so that the lock may snap into the slot when such bayonet device is used with the slotted element shown at the left in FIGURE 8. In any event, both such devices would be more complex than the L-shaped latch device of this invention, which requires no screw-turning motion to engage the cap and base. A base having the latch in the form of two or more portions with a central cylindrical or tapered lock, as possibly may exist in expanding mandrels or the like, could be utilized, the latch elements biased to gather at the center when the lock is withdrawn so that the latch portions may enter a cap, the lock being releasable from the rear. However, such embodiment would also be more complex than the base having a single-portion latch, and thus is not considered a preferred embodiment.

Many modifications will be apparent to the artisan, but the invention is to be limited only by the scope of the appended claims.

I claim:

1. A fastener comprising a base including a substantially flat portion, a gripper member extending substantially perpendicular to said flat portion, a lock member substantially parallel to said gripper member and extending outward of said flat portion, means biasing said lock member outwardly of the flat portion, said means occupying a thin space substantially parallel to said flat portion and substantially wider than its thickness, and a cap having a portion defining at least one aperture through which said gripper member and lock member may extend, with the combined transverse widths of the securing ends of the gripper member and lock member larger than the aperture when in final assembled position to prevent accidental disengagement of the cap and base, the lock member and gripper member having sufficient length to space the cap from the base flat portion, to provide a complete connector for holding perforated elements such as sheets of paper between said cap and base, said base and cap comprising smooth, non-scratching exterior surfaces.

2. A fastener as in claim 1 wherein said base further comprises a flange extending from the periphery of said flat portion outwardly of said flat portion.

3. A fastener as in claim 1 wherein the gripper member comprises an L-shaped latch having a stem portion which extends substantially perpendicular to the flat portion of the base, and a head portion extending at an angle to the outer end of the stem portion.

4. A fastener as in claim 1 further comprising a substantially tubular guide element extending from said flat portion substantially perpendicular thereto along but shorter than the extent of said lock member and gripper member, to extend between said flat portion and said cap in assembled position, said guide element having a diameter at least as large as the greatest transverse extent of the combined lock and gripped members, to prevent transverse movement of the perforated elements on the fastener.

5. A fastener as in claim 1 including means biasing said gripper member inwardly of said flat portion.

6. A cap for a fastener base portion having a gripper member and a lock member, said cap comprising a portion defining at least one aperture through which may extend an L-shaped gripper member and a straight lock member of a fastener base portion having such members, the cap further comprising a gripper member biasing means attached to said cap portion for engaging with the foot of the L-shaped gripper member at the surface of the foot adjacent the base portion, said cap comprising smooth, non-scratching exterior surfaces.

7. A cap member, adapted to be used with a clamping member having a base portion and comprising a gripper member and a lock member, said gripper member having a stem extending outwardly of said base portion and said lock member extending substantially parallel to said stem and outwardly of said base portion, said gripper member having a head extending at an angle with respect to said stem, said stem and said lock member being arranged to move longitudinally with respect to each other; said cap member having a part defining an aperture which is smaller than the combined cross sections of said head and said lock member and greater than the combined cross sections of said gripper member below said head and of said lock member, said cap member having a biasing means attached thereto and adapted to engage said gripper member at the side of the head thereof which is directed toward said base, said cap member comprising a portion adapted to enclose said gripper head when the cap member is engaged with the lock member and gripper member.

8. A fastener adapted to hold a stack of sheets of paper or other material and comprising a clamping member comprising a base having a substantially flat surface, a gripper member having a stem extending substantially perpendicular to said flat surface and having at its end remote from said flat surface a head directed at an angle with respect to said stem, a lock member extending substantially parallel with said stem and outwardly of said surface, means biasing said lock member outwardly of said surface; and a cap member having a base provided with an aperture adapted to receive said stem and lock members: said gripper member, said lock member, and the size of said aperture being so related that in the normal position of said gripper member and said lock member the combined cross sections of said lock member and of said head are greater than the combined cross sections of the lock member and of the gripper member below said head, and greater than the size of said aperture, and the combined cross sections of said lock member and of said gripper member below said head are less than the size of said aperture; the lock member and gripper member having sufficient length to space the cap member from the base flat surface; said fastener thus being adapted to hold a stack of sheets of paper or other material between said bases of said clamping and cap members and impaled on said gripper member and said lock member.

9. A fastener as in claim 8 wherein said cap member is provided with a portion adapted to cover the projecting end of said lock member and said head.

10. A fastener as in claim 9 wherein said cap cover portion is provided with an aperture to admit means adapted for pressing the lock member toward said clamping member and against the force of said biasing means to move said lock member and thus to separate said cap member from said clamping member.

11. A cap for a fastener base portion having a gripper member and a lock member, said cap comprising a portion defining at least one aperture through which may extend an L-shaped gripper member and a straight lock member of a fastener base portion having such members, the cap further comprising a lock-member release means attached to said cap portion for engaging with the end of the straight lock member, said cap comprising smooth, non-scratching exterior surfaces.

References Cited by the Examiner

UNITED STATES PATENTS

| | | | |
|---|---|---|---|
| 1,492,853 | 5/1924 | Johnson | 24—155 |
| 1,646,345 | 10/1927 | Carr | 24—211 |
| 2,464,543 | 3/1949 | Modrey. | |
| 2,476,561 | 7/1949 | Pedersen | 85—62 |
| 2,676,822 | 4/1954 | Modrey | 24—211 X |
| 2,882,579 | 4/1959 | Modrey | 24—211 |
| 2,883,930 | 4/1959 | Gott et al. | 85—79 X |

WILLIAM FELDMAN, *Primary Examiner.*

DONLEY J. STOCKING, *Examiner.*

E. SIMONSEN, *Assistant Examiner.*